United States Patent
Gannamaneni et al.

(10) Patent No.: US 12,420,655 B2
(45) Date of Patent: Sep. 23, 2025

(54) CHARGING SYSTEM OF AN ELECTRIC VEHICLE USING TRACTION INVERTER AND ELECTRIC MACHINE

(71) Applicant: Volvo Car Corporation, Gothenburg (SE)

(72) Inventors: Narendar Rao Gannamaneni, Gothenburg (SE); Lars Johan Henrik Sjöstedt, Gothenburg (SE); Andreas Lars Bertil Ådahl, Kungsbacka (SE)

(73) Assignee: VOLVO CAR CORPORATION, Gothenburg (SE)

(*) Notice: Subject to any disclaimer, the term of this patent is extended or adjusted under 35 U.S.C. 154(b) by 795 days.

(21) Appl. No.: 17/587,681

(22) Filed: Jan. 28, 2022

(65) Prior Publication Data

US 2022/0274496 A1    Sep. 1, 2022

Related U.S. Application Data

(60) Provisional application No. 63/155,032, filed on Mar. 1, 2021.

(51) Int. Cl.
*B60L 53/50* (2019.01)
*B60L 53/22* (2019.01)
*B60L 53/62* (2019.01)
*H02J 7/34* (2006.01)

(52) U.S. Cl.
CPC ............ *B60L 53/50* (2019.02); *B60L 53/22* (2019.02); *B60L 53/62* (2019.02); *H02J 7/345* (2013.01); *B60L 2210/12* (2013.01); *H02J 2207/20* (2020.01)

(58) Field of Classification Search
CPC ..................................................... B60L 53/24
USPC ............................................................. 320/104
See application file for complete search history.

(56) References Cited

U.S. PATENT DOCUMENTS

| 9,120,390 | B2 | 9/2015 | King et al. |
| 10,857,898 | B2 * | 12/2020 | Shin ................. B60L 53/24 |
| 2020/0313581 | A1 | 10/2020 | Chon et al. |
| 2020/0361323 | A1 * | 11/2020 | Chon ................. H02M 7/44 |

FOREIGN PATENT DOCUMENTS

| CA | 2 983 328 A1 | 12/2018 |
| CN | 111791728 A | 10/2020 |
| CN | 112297935 A | 2/2021 |

(Continued)

OTHER PUBLICATIONS

Extended European Search Report received for E.P Patent Application Serial No. 22159435.1 dated Jul. 8, 2022, 9 pages.

(Continued)

*Primary Examiner* — Edward Tso
*Assistant Examiner* — Ahmed H Omar
(74) *Attorney, Agent, or Firm* — Amin, Turocy & Watson, LLP

(57) ABSTRACT

An electric vehicle charging system is provided. In some embodiments, the electric vehicle charging system can comprise a three-phase electric motor and an inverter. The inverter can be connected to the three-phase electric motor and to a battery. In various implementations, the inverter can comprise a switch and a capacitor. In further implementations, the switch can close to precharge a capacitor to a defined fraction of a voltage of the battery.

20 Claims, 7 Drawing Sheets

(56) References Cited

FOREIGN PATENT DOCUMENTS

| | | |
|---|---|---|
| DE | 10-2018-124787 A1 | 4/2020 |
| DE | 10 2019 133 705 A1 | 7/2020 |
| WO | WO2020248023 A1 * | 6/2020 .............. B60L 50/50 |

OTHER PUBLICATIONS

Communication pursuant to Article 94(3) EPC received for EP Patent Application Serial No. 22159435.1 dated Feb. 22, 2024, 9 pages.

First Office Action received for Chinese Patent Application Serial No. 202210193231.3 dated Nov. 26, 2024, 22 pages(Including English Translation).

Office Action received for Chinese Patent Application No. 202210193231.3 dated May 27, 2025, 6 pages (including English Machine Translation).

* cited by examiner

CHARGING SYSTEM OF AN ELECTRIC VEHICLE USING TRACTION INVERTER AND ELECTRIC MACHINE

CROSS-REFERENCE TO RELATED APPLICATION

This application claims priority to U.S. Provisional Patent Application No. 63/155,032, filed on Mar. 1, 2021, and entitled "CHARGING SYSTEM OF AN 800V VEHICLE USING TRACTION INVERTER & ELECTRIC MACHINE," the entirety of which application is hereby incorporated by reference herein.

TECHNICAL FIELD

The disclosed subject matter relates to electric vehicle charging systems, and more particularly, to electric vehicle charging systems that leverage a traction inverter and electric machine to utilize a charging station that outputs a voltage lower than a voltage of an electric vehicle battery.

BACKGROUND

There exist two main types of electric vehicle charging: (1) alternating current (AC) charging, in which a vehicle is connected to a residential or public AC outlet and is typically referred to as slow charging; and (2) direct current (DC) charging, in which the vehicle is connected to a DC charging outlet and is typically referred to as DC fast charging. During DC fast charging, the battery in the electric vehicle is directly connected to a DC charging station, so that the station can deliver a high current. Many electric vehicles comprise 400 volt (V) battery storage systems. In such 400V systems, in order to charge at 200 kilowatts (kW), for example, the vehicle draws 500 amps (A) from the charging station. However, if the battery voltage increases from 400V to 800V (e.g., in an 800V electric vehicle), for the same 200 kW power, the vehicle will draw 250 A from the charging station (half the current drawn by 400V battery system). At present, few vehicles utilize 800V battery systems, and most of the installed DC charging stations possess a maximum operating voltage of up to 500V. Thus, a conventional 800V vehicle requires an additional DC-DC converter or booster in order to charge from such 400V stations, which can result in increased volume, weight, and cost of a corresponding electric vehicle.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. As described, there exists a need for a cheaper, more space-efficient boosting system for charging 800V electric vehicles with 400V charging stations (or other voltage electric vehicles that comprise voltages greater than charging stations).

According to an embodiment, an electric vehicle charging system can comprise a three-phase electric motor, and an inverter connected to the three-phase electric motor and to a battery, wherein the inverter comprises a switch and a capacitor, and wherein the switch closes to precharge a capacitor to a defined fraction of a voltage of the battery.

According to another embodiment, an electric vehicle can comprise: a three-phase electric motor, an inverter connected to the three-phase electric motor and to a battery, wherein the inverter comprises a switch and a capacitor, and a controller, comprising a processor, that closes switch closes to precharge a capacitor to a defined fraction of a voltage of the battery in response to a determination, by the controller, that a charging station connected to the electric vehicle comprises an output voltage lower than the voltage of the battery.

According to an additional embodiment, a method can comprise: in response to a determination, by a system comprising a processor, that a maximum voltage of a battery is greater than a maximum voltage of a charging station, closing, by the system, a switch to enable a capacitor to precharge from the battery, in response to a determination, by the system, that the capacitor has precharged to a defined voltage, determining, by the system, a maximum direct current input current of the charging station and converted battery current request current, and in response to determining, by the system, a minimum of the maximum direct current input current of the charging station and the converted battery current request current, sending, by the system, a current request signal to the charging station, wherein the current request signal comprises the minimum of the maximum direct current input current of the charging station and the converted battery current request current.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
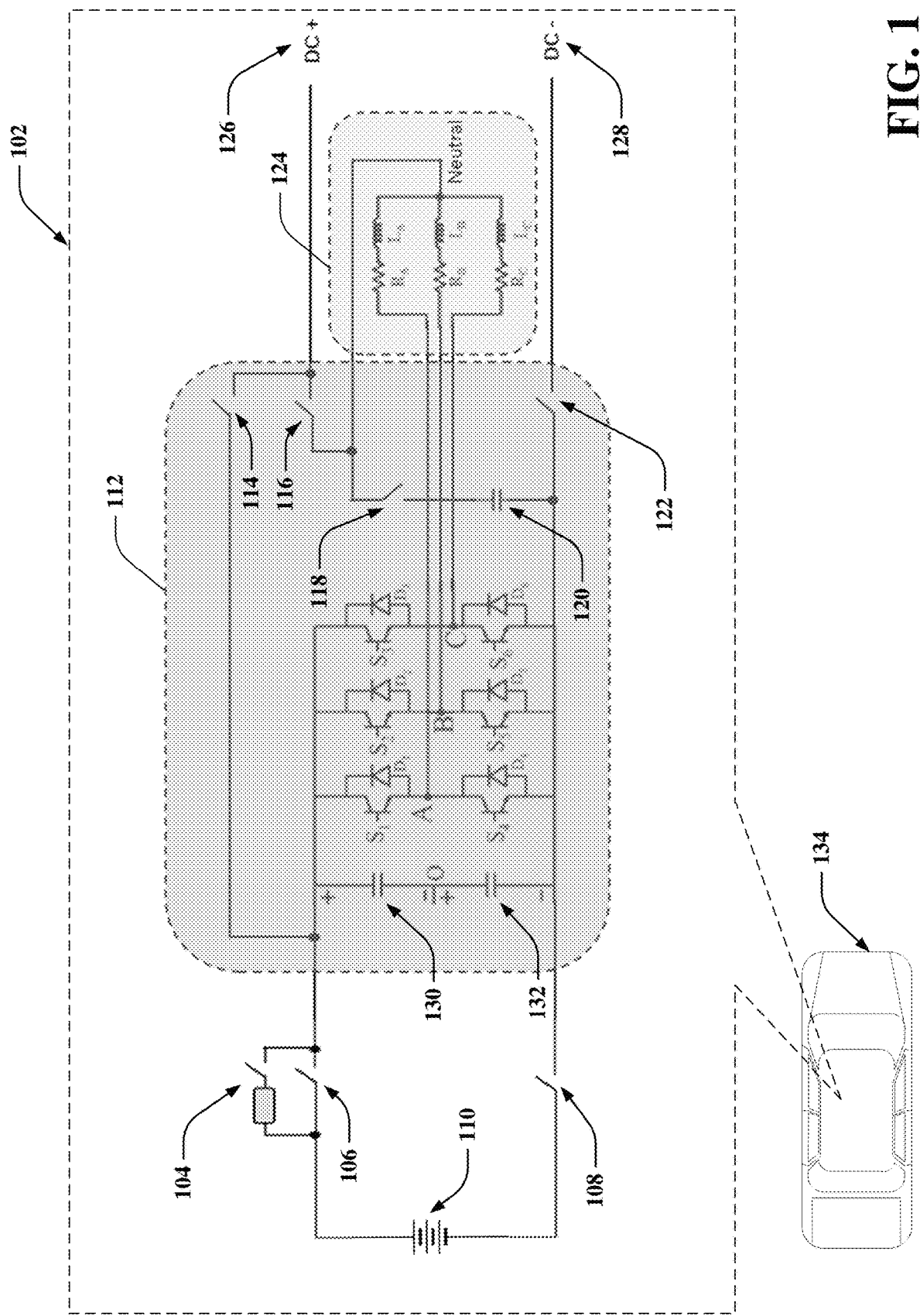
FIG. 1 illustrates a block diagram of an example charging system of an electric vehicle in accordance with one or more embodiments described herein.

FIG. 1 illustrates an example, a non-limiting charging system 102 (e.g., of a vehicle 134) in accordance with one or more embodiments is described herein. In various embodiments, charging system 102 can comprise switch 104, switch 106, switch 108, switch 122, switch 116, switch 114, switch 118, capacitor 120, capacitor 130, capacitor 132, direct current (DC) positive terminal 126, DC negative terminal 128, battery 110, inverter 112, and/or three-phase electric motor 124.

According to an embodiment, the three-phase electric motor 124 (e.g., an e-Machine or an alternating current (AC) electric motor) can comprise three-phase stator windings, and can be connected to a common point (e.g., neutral terminal or circuit) and an inverter 112, which can generate three phase power as required by the three-phase electric motor 124.

According to an embodiment, the inverter 112 can comprise at least six switches: insulated-gate bipolar transistors (IGBTs) or Silicon Carbide (SiC) metal-oxide-semiconductor field-effect transistors (MOSFETs), or other suitable switches, contactors, or relays. The switches (e.g., semiconductor switches) (e.g., $S_1$, $S_2$, $S_3$, $S_4$, $S_5$, and $S_6$) can comprise built-in body diodes (e.g., $D_1$, $D_2$, $D_3$, $D_4$, $D_5$, and $D_6$). Two capacitors (e.g., capacitors 130 and 132) can be located on the input side of inverter 112, though it is noted that the inverter 112 can comprise other quantities or combinations of capacitors. In various embodiments, $L_A$, $L_B$, and $L_C$ can comprise the stator inductances of the three-phase electric motor 124, and $R_A$, $R_B$, and $R_C$ can comprise winding resistances.

In order to prevent an addition of a dedicated DC-DC booster which, when omitted, greatly reduces the packaging volume, weight, and cost, embodiments herein can charge the battery 110 by utilizing the three-phase electric motor 124 and inverter 112 inside the vehicle 134. Because an electric motor (e.g., three-phase electric motor 124) and inverter (e.g., inverter 112) are otherwise idle during battery 110 charging, DC-DC boosting can be realized without adding a standalone DC-DC booster (e.g., by utilizing the coils in the three-phase electric motor 124 to provide energy storage capability required during boost operation). In various embodiments, the inverter 112 and three-phase electric motor 124 can be rated at 100 kW to 150 kW. Thus, DC-DC booster functionality can be realized with 100 kW to 150 kW power during charging from 400V stations, through other kW ratings can be utilized. Additionally, smaller electromagnetic compatibility (EMC) filters can be utilized when using the three-phase electric motor 124 and inverter 112 to boost DC voltage, as compared to utilizing a standalone booster.

In various embodiments, the inverter 112 can comprise one or more switches and one or more capacitors, and the three-phase electric motor 124 can be accessed through a separate busbar. It is noted that, in one or more embodiments, the switches 122, 116, 114, and 118, and capacitor 120 can be located inside the inverter 112. The capacitor 120 can be utilized during a boost operation when DC positive terminal 126 and DC negative terminal 128 are connected to a 400V DC charging station. When the DC positive terminal 126 and DC negative terminal 128 are connected to 800V DC charging station, the capacitor 120 does not need to be utilized, since there is no need for a boost operation. In this regard, an 800V charging station can directly charge the 800V battery. The capacitor 120 can be disabled or enabled by opening or closing the switch 118 which can be turned ON or OFF, depending on the charging station voltage level (e.g., a 400V charging station vs. an 800V charging station). In some embodiments, the switch 118 can be circuit driven and responsive to an input of a defined voltage. In other embodiments, the switch 118 can be controlled by a controller (e.g., as later discussed herein). It is noted that by implementing switch 118, capacitor 120 does not need to comprise a voltage greater than battery 110, thus reducing the size and weight of the capacitor 120. Thus, various embodiments, the capacitor 120 can comprise a 400V capacitor 120. It is noted that in various embodiments the capacitor 120 can be connected in parallel to or series with the three-phase electric motor 124 and the inverter 112 (e.g., by opening or closing one or more of switches 104, 106, 108, 122, 116, 114, and/or 118).

According to an embodiment, pre-charging of the capacitor 120 can be performed before the 400V DC charging station is connected to DC positive terminal 126 and DC negative terminal 128, and/or before power transfer from a charging station (e.g., charging station 206 as later discussed herein) to the battery 110 is initiated. In order to perform a pre-charge operation of the capacitor 120, the inverter 112 can operate as a buck DC-DC converter from the 800V battery as an input and charge the capacitor 120 with, for example, a 0.5 (50%) duty ratio. According to an embodiment, the capacitor 120 can be charged up to half of the battery 110 voltage. For example, if battery 110 voltage comprises 760V, the capacitor 120 can be charged up to 380V. The switches (e.g., semi-conductor switches) inside inverter 112 (e.g., $S_1$ and $D_4$ (body diode of $S_4$)) can be utilized in a one-phase buck operation to charge capacitor 120 with switch 118 closed. Once capacitor 120 is pre-charged up to half of the battery 110 voltage, switches 122 and 116 can be closed so that a 400V charging station can initiate the power transfer.

Because there exist different global DC charging standards, there exist different pre-conditions to close the switches 122 and 116. With the CCS (Combined Charging System) standard, the voltage difference between the capacitor 120 voltage and 400V charging station output can be less than or equal to 20V in order to close the switches 122 and 116. In this regard, 400V CCS charging stations can pre-charge their output, which is close to capacitor 120 voltage, before the switches 122 and 116 are closed. For other DC charging standards (e.g., CHAdeMO, GB/T DC, Chaoji, etc.), the switches 122 and 116 can be closed after capacitor 120 pre-charges to half of the battery 110 voltage so that a 400V DC charging station can initiate internal pre-charge inside the charging station.

Figure 2:
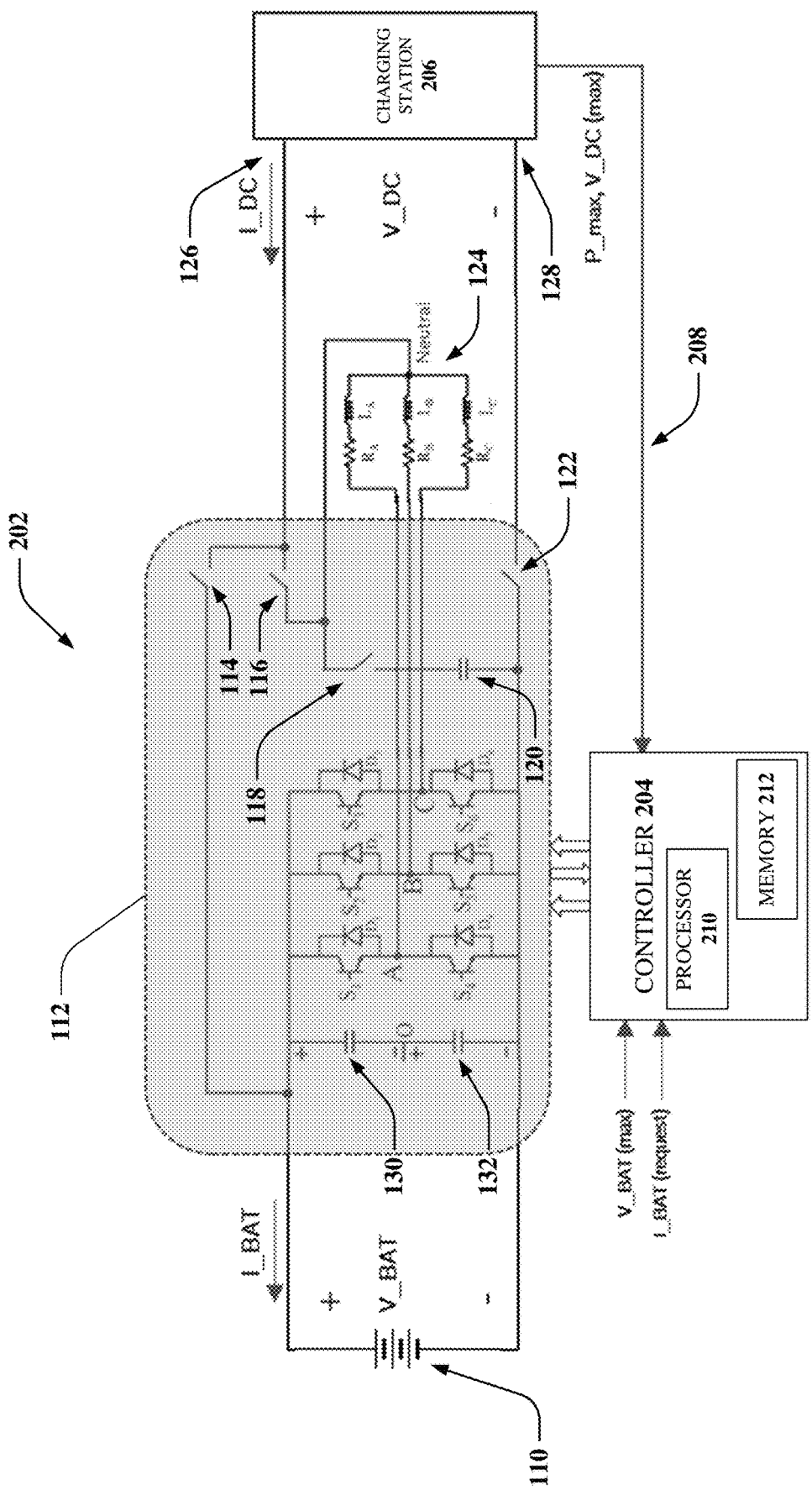
FIG. 2 illustrates a block diagram of a charging system in accordance with one or more embodiments described herein.

Turning now to FIG. 2, a non-limiting charging system 202 in accordance with one or more embodiments is described herein. Charging system 202 can be similar to 102, and can comprise switch 104, switch 106, switch 108, switch 122, switch 116, switch 114, switch 118, capacitor 120, capacitor 130, capacitor 132, DC positive terminal 126, DC negative terminal 128, battery 110, inverter 112, and/or three-phase electric motor 124. Repetitive description of like elements and/or processes employed in respective embodiments is omitted for sake of brevity.

Charging system 202 can additionally comprise controller 204 (e.g., comprising processor 210 and memory 212). In various embodiments, the controller 204 (e.g., a microcontroller) can be connected to charging station 206 via bus 208 (e.g., a Controller Area Network (CAN bus) or Communication Protocol (PLCBUS)). It is noted that in various embodiments, the vehicle 134 can comprise the charging system 202.

In various embodiments, signals V_BAT and I_BAT can comprise actual voltage measurements and current measurements of battery 110, respectively. Similarly, V_DC and I_DC can comprise actual DC inlet voltage and current measurements, respectively. Signals P_max and V_DC (max) can be transferred to a vehicle from the charging station 206 (e.g., via bus 208 between a controller 204 and charging station 206). Signal P_max can represent the maximum power that the charging station 206 can deliver to the vehicle 134 or charging system 202, and V_DC(max) can represent the maximum voltage that the charging station 206 can provide to the vehicle DC inlet (e.g., 126 and 128).

In various implementations, the controller 204 can control the switches 122, 116, 114, and 118, and can also control the semi-conductor switches ($S_1$, $S_2$, $S_3$, $S_4$, $S_5$, and $S_6$) inside the inverter 112. The controller 204 can receive (e.g., from a battery or charge controller) or determine (e.g., via a voltmeter) the maximum voltage of battery 110 V_BAT (max) (e.g., which can correspond to a full state of charge of the battery 110) of the vehicle 134. The controller 204 can additionally/alternatively determine or receive (e.g., a vehicle charging controller of the vehicle 134) the battery current request signal I_BAT(request) (e.g., via the bus 208). In further embodiments, the controller 204 can determine V_BAT(max) and/or I_BAT(request). In one or more embodiments, the controller 204 can be located inside the inverter 112, though the controller 204 can additionally/alternatively be located external to the inverter 112. In this regard, the same controller 204 and inverter 112, which can be used to drive the vehicle 134, can also be used during DC fast charging (e.g., as described herein).

In various embodiments, the controller 204 can comprise a memory 212 which can store one or more computer/machine readable and/or executable components and/or instructions that, when executed by a processor 210 (e.g., a classical processor, a quantum processor, etc.), can facilitate performance of operations defined by the executable component(s) and/or instruction(s). The memory can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. The controller 204 can comprise a processor which can comprise one or more types of processors and/or electronic circuitry (e.g., a classical processor, graphics processor, a quantum processor, etc.) that can implement one or more computer and/or machine readable, writable, and/or executable components and/or instructions that can be stored on a memory. For example, the processor can perform various operations that can be specified by such computer and/or machine readable, writable, and/or executable components and/or instructions including, but not limited to, logic, control, input/output (I/O), arithmetic, and/or the like. In some embodiments, processors herein can comprise one or more central processing unit, multi-core processor, microprocessor, dual microprocessors, microcontroller, System on a Chip (SOC), array processor, vector processor, quantum processor, and/or another type of processor.

Figure 3:
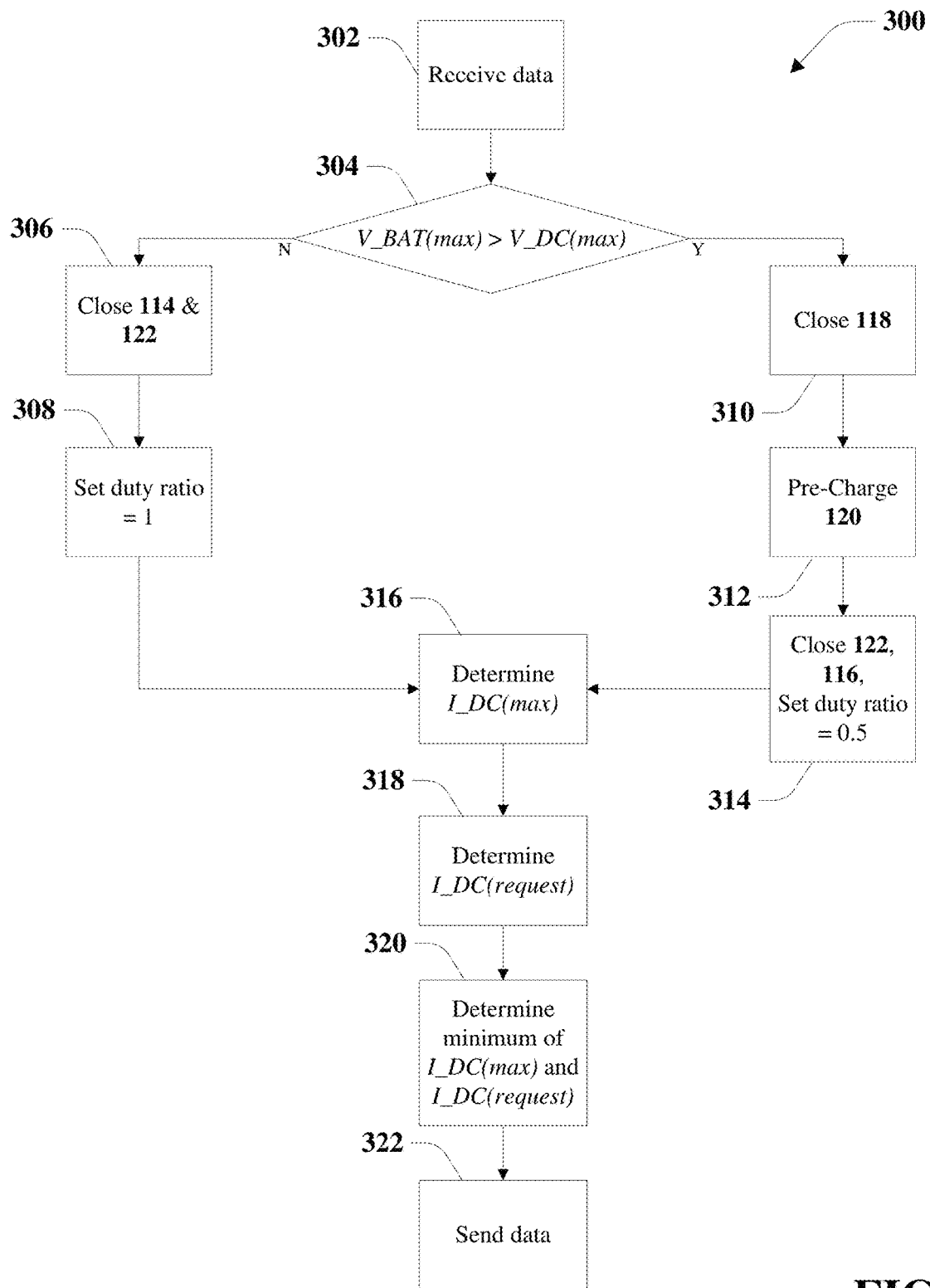
FIG. 3 illustrates a flowchart of an example, non-limiting charging process in accordance with one or more embodiments described herein.

With reference to FIG. 3, a flowchart 300 of an example, non-limiting charging process in accordance with one or more embodiments described herein is depicted. In this regard, flowchart 300 can represent a charging process of the charging system 102 or 202 (or another suitable charging system). At 302, after a vehicle is plugged into a charging station (e.g., charging station 206), a microcontroller (e.g., a controller 204) can communicate with the charging station 206 (e.g., via bus 208 or wirelessly). The controller 204 can determine charging station 206 maximum voltage V_DC (max), and compare V_DC(max) with maximum battery 110 voltage V_BAT(max). At 304, if the battery 110 maximum voltage V_BAT(max) is greater than charging station 206 maximum voltage V_DC(max) (e.g., as provided by the charging station 206 over the bus 208), the charging station 206 can be determined to comprise a 400V DC charging station 206. When the charging station 206 comprises a 400V charging station 206, the switch 118 can be closed at 310 to enable pre-charging of the capacitor 120 at 312 (e.g., from battery 110) by changing the power flow direction of inverter 112 and operating the three-phase electric motor 124 as a buck DC-DC converter. In various embodiments, the capacitor 120 can be pre-charged to half the battery 110 voltage (e.g., by utilizing a fixed duty ratio of 0.5 (50%)). In this regard, the voltage V_DC on a DC inlet can be equal to 0.5*V_BAT, and the voltage across capacitor 120 can be equal to 0.5*V_BAT. For example, V_BAT=760V, then V_DC can be equal to 380V. At 314, the buck mode operation of inverter 112 and three-phase electric motor 124 can be disabled, and the switches 122 and 116 can be closed (e.g., immediately closed) so that power transfer can occur via the three-phase electric motor 124 and inverter 112. If at 304, the maximum battery 110 voltage V_BAT(max) is lower than or equal to the V_DC(max) provided by the charging station 206, the switches 122 and 114 can be closed at 306 so that power transfer can bypass the three-phase electric motor 124 and inverter 112. In this regard, the charging station 206 can be determined to comprise an 800V DC charging station 206, which can directly charge the battery 110 (e.g., when the battery comprises an 800V battery 110). At 308, the duty ratio can be set to 1 (100%). At 316, a maximum input current I_DC(max) that the charging station 206 can provide can be determined (e.g., by the controller 204) using I_DC(max)=P_max/V_DC (e.g., based on the P_max information which is the maximum power provided by 400V charging station 206). For example, if P_max is 100 kW and V_DC=380V, then I_DC(max)=263 A. At 318, the controller 204 can determine I_DC(request)=I_BAT(request)/duty ratio (e.g., 0.5). At 320, the controller 204 can determine the minimum of I_DC (max) and I_DC(request). At 322, the controller 204 can send data (e.g., via the bus 208) comprising the minimum of IDC (max) and I_DC(request) to the charging station 206. In this regard, the signal I_BAT(request) can correspond to 800V, so the equivalent current to 400V I_DC(request)= I_BAT(request)/duty ratio. For example, I_BAT(request)= 100 A, then the equivalent current on 400V input can be 200 A (e.g., duty ratio of 0.5). In this regard, minimum of I_DC (max) and I_DC(request) (e.g., 200 A & 263 A) is 200

A, and data comprising a 200 A request can be sent (e.g., via the bus 208) to the charging station 206, so that the charging station 206 can deliver IDC=200 A. In various embodiments, the semi-conductor switches inside the inverter 112 (e.g., $S_1$, $S_2$, $S_3$, $S_4$, $S_5$, and $S_6$) can be operated with a duty ratio of 0.5 along with 120 deg. interleaved operation. In various embodiments, the input current ripple on IDC signal is thus reduced or minimized when the three arms of the inverter 112 are operated with a duty cycle of 0.5 and 120 deg. phase shift between each arm.

Figure 4:
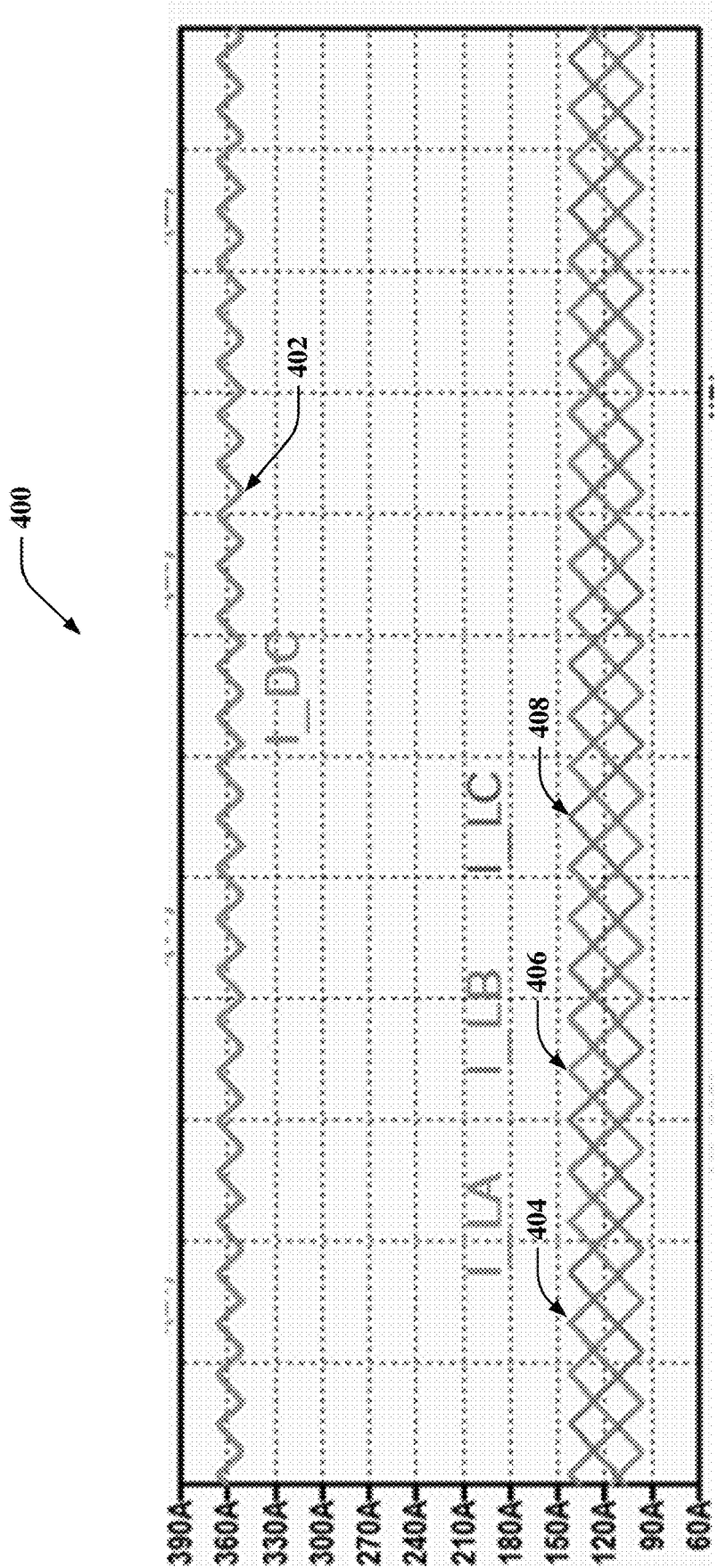
FIG. 4 illustrates exemplary, non-limiting current waveforms in accordance with one or more embodiments described herein.

FIG. 4 illustrates exemplary, non-limiting current waveforms in accordance with one or more embodiments described herein. In this regard, stator currents I_LA 404, I_LB 406, and I_LC 408 are shown in FIG. 4. The sum of stator currents I_LA 404, I_LB 406, and I_LC 408 can comprise the input current (I_DC) on the DC inlet (e.g., of the vehicle 134 and/or charging system 202). When the charging station 206 comprises an 800V charging station 206, switches 122 and 114 can be closed (e.g., by the controller 204) after comparing the V_DC(max) information from station with the V_BAT(max). Next, voltage V_DC on the DC inlet can be equal to V_BAT. The controller 204 can then calculate I_DC(max) provided by station using I_DC (max)=P_max/V_DC. Next, the controller 204 can determine the minimum of I_DC (max) and I_DC(request). When the charging station 206 comprises an 800V charging station 206, the duty ratio can be set to 1. Thus, I_DC(request)= I_BAT(request) which can be compared with I_DC(max). The minimum of I_DC(max) and I_DC(request) can be represented in a current request message transferred to the charging station 206 (e.g., by the controller 204 via the bus 208), so that station can deliver I_DC.

Figure 5:
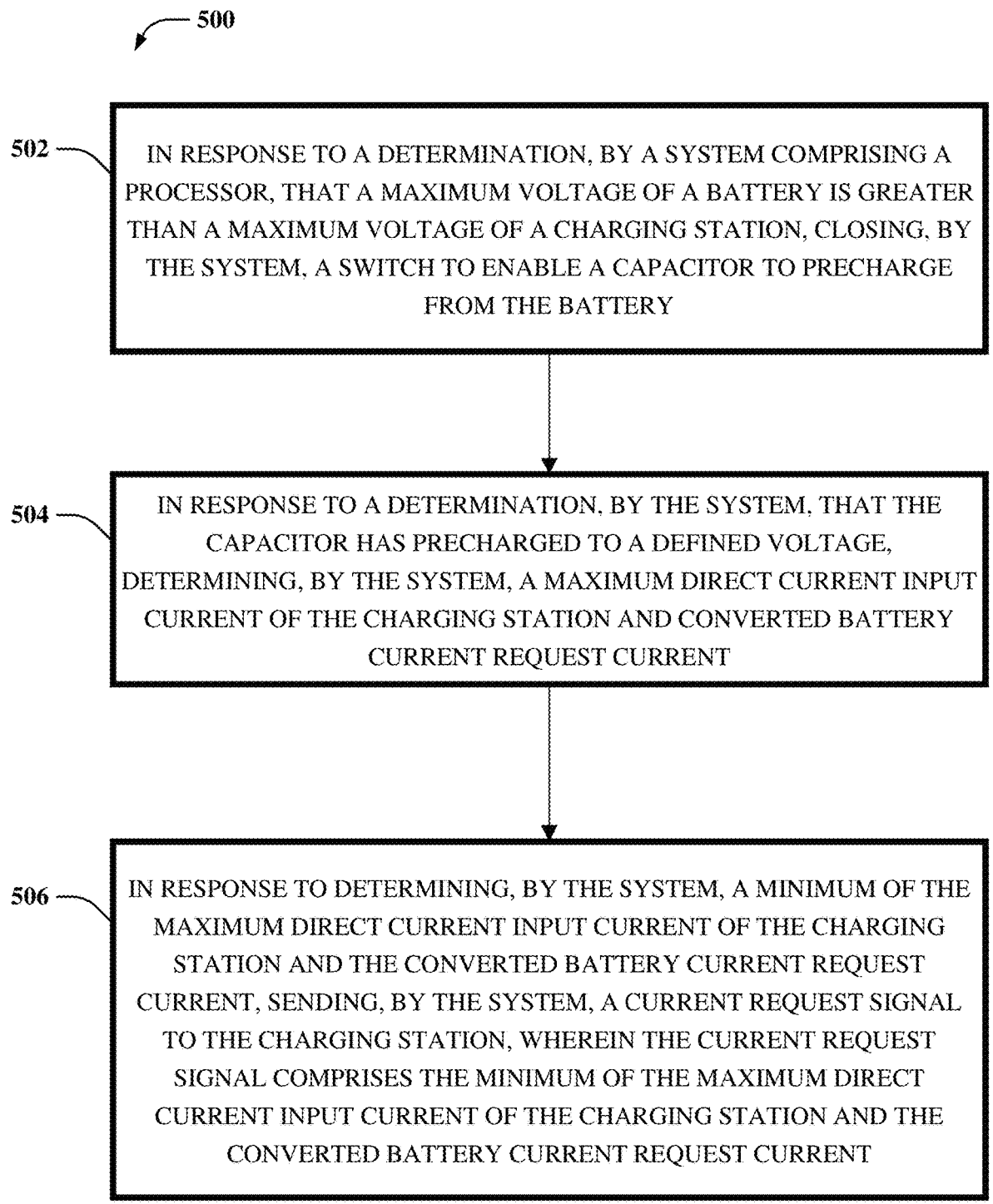
FIG. 5 illustrates a flow diagram of an example, non-limiting battery charging process in accordance with one or more embodiments described herein.

FIG. 5 illustrates a flow diagram of an example, non-limiting battery charging process 500 in accordance with one or more embodiments described herein. Repetitive description of like elements and/or processes employed in respective embodiments is omitted for sake of brevity. At 502, process 500 can comprise in response to a determination, by a system comprising a processor (e.g., controller 204), that a maximum voltage of a battery (e.g., battery 110) is greater than a maximum voltage of a charging station (e.g., charging station 206), closing, by the system, a switch (e.g., switch 118) to enable a capacitor (e.g., capacitor 120) to precharge from the battery (e.g., battery 110). At 504, process 500 can comprise in response to a determination, by the system, that the capacitor (e.g., capacitor 120) has precharged to a defined voltage (e.g., up to charging station 206 voltage or half of battery 110 voltage, or another suitable defined voltage), determining, by the system, a maximum direct current input current of the charging station (e.g., charging station 206) and converted battery current request current. At 506, the process 500 can comprise in response to determining, by the system, a minimum of the maximum direct current input current of the charging station and the converted battery current request current, sending, by the system, a current request signal to the charging station (e.g., charging station 206), wherein the current request signal comprises the minimum of the maximum direct current input current of the charging station and the converted battery current request current.

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, systems herein (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, a system herein can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, systems herein can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

Systems herein can comprise one or more computer and/or machine readable, writable, and/or executable components and/or instructions that, when executed by processor (e.g., a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, any component associated with systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments or systems herein and/or any components associated therewith as disclosed herein, can employ a processor to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system herein can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 6:
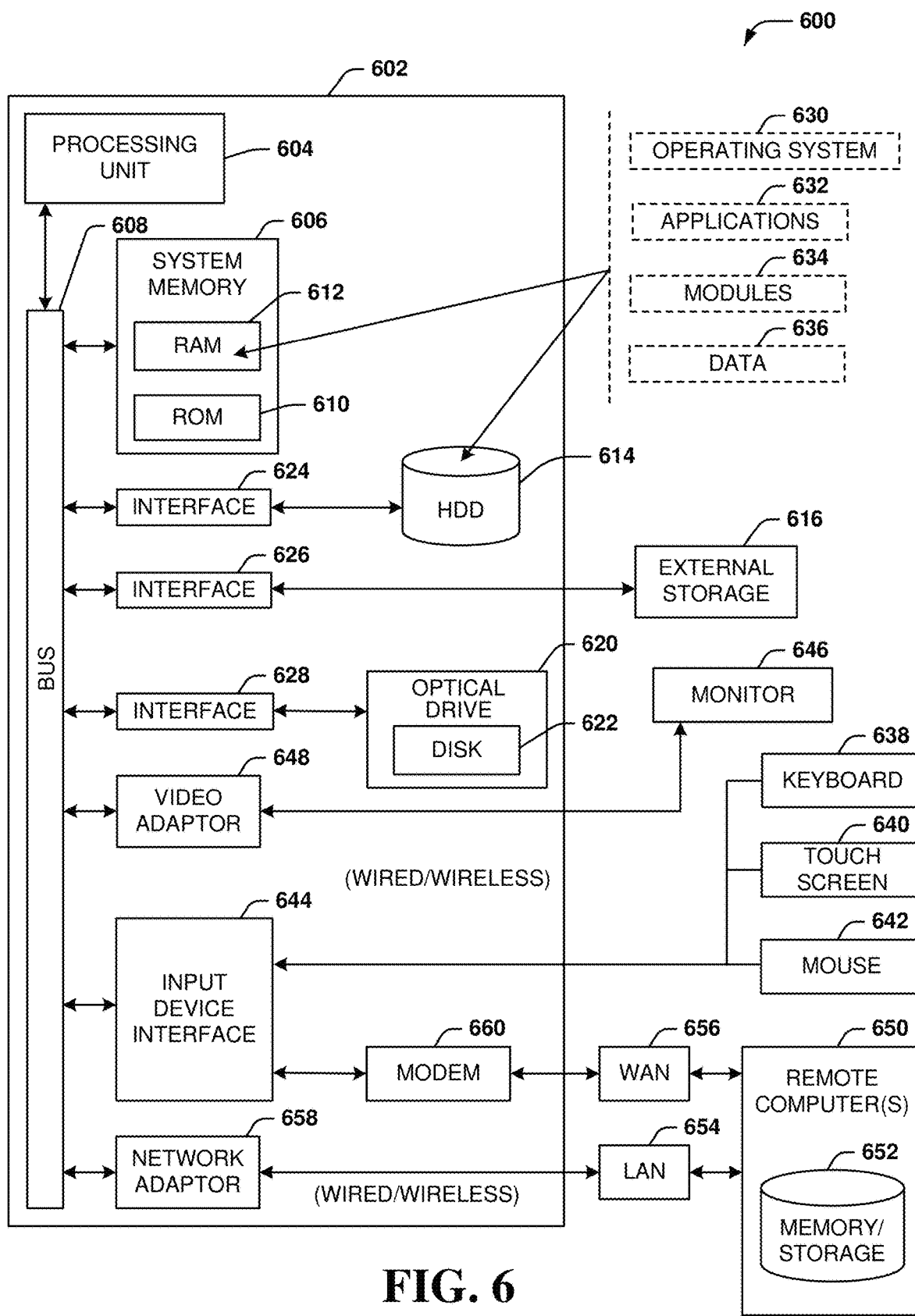
FIG. 6 is an example, non-limiting computing environment in which one or more embodiments described herein can be implemented.

In order to provide additional context for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data.

The computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and an optical disk drive 620 (e.g., which can read or write from a CD-ROM disc, a DVD, a BD, etc.). While the internal HDD 614 is illustrated as located within the computer 602, the internal HDD 614 can also be configured for external use in a suitable chassis (not shown).

Additionally, while not shown in environment 600, a solid-state drive (SSD) could be used in addition to, or in place of, an HDD 614. The HDD 614, external storage device(s) 616 and optical disk drive 620 can be connected to the system bus 608 by an HDD interface 624, an external storage interface 626 and an optical drive interface 628, respectively. The interface 624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

Further, computer 602 can be enable with a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can be also connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN) 656. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the Internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 7:
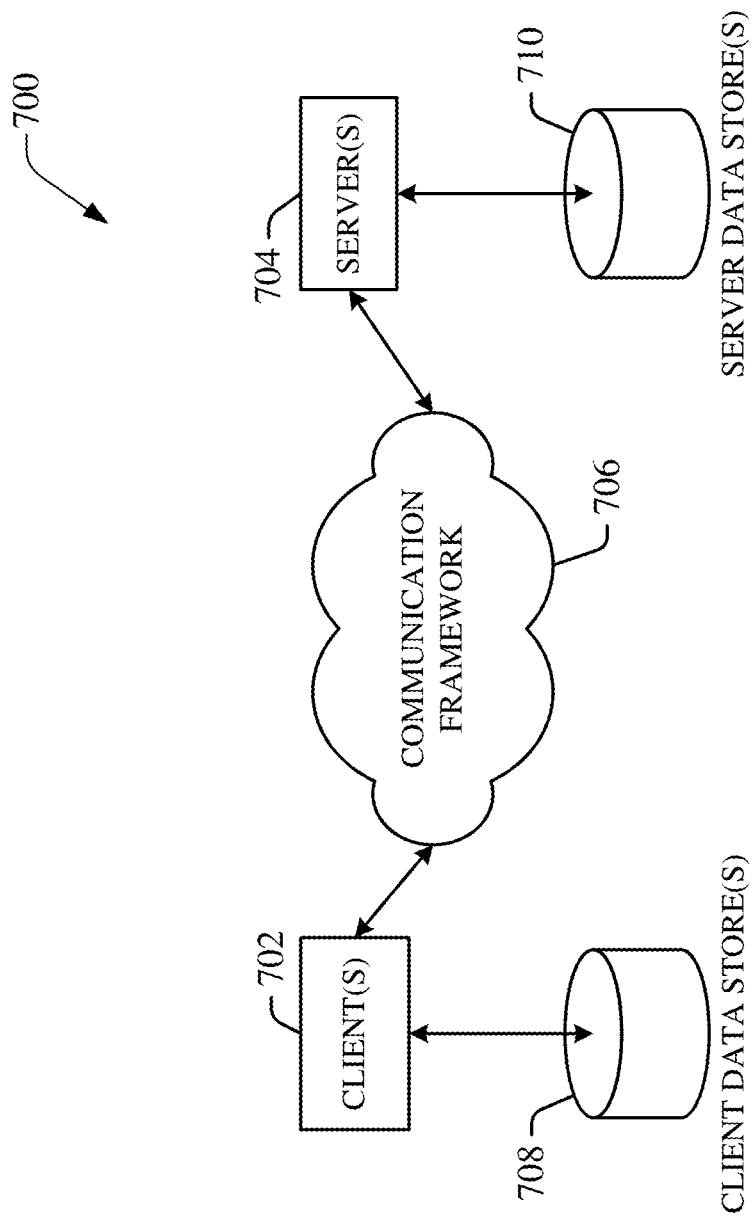
FIG. 7 is an example, non-limiting networking environment in which one or more embodiments described herein can be implemented.

Referring now to FIG. 7, there is illustrated a schematic block diagram of a computing environment 700 in accordance with this specification. The system 700 includes one or more client(s) 702, (e.g., computers, smart phones, tablets, cameras, PDA's). The client(s) 702 can be hardware and/or software (e.g., threads, processes, computing devices). The client(s) 702 can house cookie(s) and/or associated contextual information by employing the specification, for example.

The system 700 also includes one or more server(s) 704. The server(s) 704 can also be hardware or hardware in combination with software (e.g., threads, processes, computing devices). The servers 704 can house threads to perform transformations of media items by employing aspects of this disclosure, for example. One possible communication between a client 702 and a server 704 can be in the form of a data packet adapted to be transmitted between two or more computer processes wherein data packets can include coded analyzed headspaces and/or input. The data packet can include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

In one exemplary implementation, a client 702 can transfer an encoded file, (e.g., encoded media item), to server 704. Server 704 can store the file, decode the file, or transmit the file to another client 702. It is to be appreciated, that a client 702 can also transfer uncompressed file to a server 704 and server 704 can compress the file and/or transform the file in accordance with this disclosure. Likewise, server 704 can encode information and transmit the information via communication framework 706 to one or more clients 702.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

An electric vehicle charging system, comprising:
a three-phase electric motor; and
an inverter connected to the three-phase electric motor and to a battery, wherein the inverter comprises a switch and a capacitor, and wherein the switch closes to precharge a capacitor to a defined fraction of a voltage of the battery.

2. The electric vehicle charging system of any preceding clause, wherein the three-phase electric motor operates as a buck direct current to direct current converter.

3. The electric vehicle charging system of any preceding clause, wherein the defined fraction comprises ½ the voltage of the battery.

4. The electric vehicle charging system of any preceding clause, wherein the inverter is connected to a charging station.

5. The electric vehicle charging system of any preceding clause, wherein the charging station comprises an output voltage lower than the voltage of the battery.

6. The electric vehicle charging system of any preceding clause, wherein the charging station comprises a 400 volt charging station, and wherein the battery comprises an 800 volt battery.

7. The electric vehicle charging system of any preceding clause, wherein the inverter comprises a duty ratio of 50%.

8. The electric vehicle charging system of clause 1 above with any set of combinations of electric vehicle charging systems 2-7 above.

9. An electric vehicle, comprising:
a three-phase electric motor;
an inverter connected to the three-phase electric motor and to a battery, wherein the inverter comprises a switch and a capacitor; and
a controller, comprising a processor, that closes switch closes to precharge a capacitor to a defined fraction of a voltage of the battery in response to a determination, by the controller, that a charging station connected to the electric vehicle comprises an output voltage lower than the voltage of the battery.

10. The electric vehicle of any preceding clause, wherein the three-phase electric motor and the inverter operate as a direct current to direct current booster in a first power flow direction, wherein the first power flow direction comprises a direction for transmitting power from the charging station to the battery; and
the three-phase electric motor and the inverter operate as a buck direct current to direct current converter in a second power flow direction, wherein the second power flow direction comprises a direction for transmitting power supplied by the battery to the capacitor.

11. The electric vehicle of any preceding clause, wherein
in the first power flow direction, the capacitor is connected in parallel to the three-phase electric motor and the inverter operating as the direct current to direct current booster; and
in the second power flow direction, the capacitor is connected in series with the inverter and the three-phase electric motor operating as a buck direct current to direct current converter.

12. The electric vehicle of any preceding clause, wherein the inverter comprises a three-phase inverter.

13. The electric vehicle of any preceding clause, wherein the capacitor is connected to a neutral circuit of the three-phase electric motor and each phase the three-phase electric motor is connected to a respective phase of the inverter.

14. The electric vehicle of any preceding clause, wherein the inverter comprises at least six semi-conductor switches.

15. The electric vehicle of any preceding clause, wherein the at least six semi-conductor switches comprise insulated-gate bipolar transistors or silicon carbide metal-oxide-semi-conductor field-effect transistors.

16. The electric vehicle of clause 9 above with any set of combinations of electric vehicles 10-15 above.

17. A method, comprising:
in response to a determination, by a system comprising a processor, that a maximum voltage of a battery is greater than a maximum voltage of a charging station, closing, by the system, a switch to enable a capacitor to precharge from the battery;
in response to a determination, by the system, that the capacitor has precharged to a defined voltage, determining, by the system, a maximum direct current input current of the charging station and converted battery current request current; and
in response to determining, by the system, a minimum of the maximum direct current input current of the charging station and the converted battery current request current, sending, by the system, a current request signal to the charging station, wherein the current request signal comprises the minimum of the maximum direct current input current of the charging station and the converted battery current request current.

18. The method of any preceding clause, wherein the converted battery current request current comprises a current request based on a voltage of the battery divided by a duty ratio.

19. The method of any preceding clause, wherein the duty ratio comprises 50%.

20. The method of any preceding clause, further comprising:
in response to sending, by the system, the current request signal, charging, by the system, the battery from the charging station using a three-phase electric motor and an inverter of the system.

21. The method of any preceding clause, wherein the switch comprises a first switch, wherein charging the battery comprises closing a second switch and a third switch, and wherein the second switch connects the inverter to the charging station and the third switch connects the three-phase electric motor to the charging station.

22. The method of any preceding clause, wherein the charging station comprises a 400 volt charging station, and wherein the battery comprises an 800 volt battery.

23. The method of clause 17 above with any set of combinations of methods 18-22 above.

What is claimed is:

1. An electric vehicle charging system, comprising:
a controller, comprising a processor;
a three-phase electric motor; and
an inverter connected to the three-phase electric motor and to a battery, wherein the inverter comprises a switch, a bypass switch, a capacitor pre-charge switch, and a capacitor,
wherein the capacitor pre-charge switch is located between a positive terminal of a charging station and the switch, closable based on a type of the charging station,
wherein the controller closes the switch to pre-charge the capacitor via the battery using the inverter and the three-phase electric motor in a buck mode, to a defined fraction of a voltage of the battery, in response to a determination, by the controller, that the charging station connected to an electric vehicle comprises a maximum output voltage lower than a maximum voltage of the battery, wherein the controller closes the bypass switch to charge the battery directly from the charging station, without using the three-phase electric motor and the inverter for a boost operation, in response to a determination that the maximum voltage of the battery is lower than or equal to the maximum output voltage of the charging station, wherein the battery is charged using the capacitor, inverter, and three-phase electric motor when the charging station comprises an output voltage lower than the voltage of the battery, and wherein based on a type of the charging station, the controller closes the capacitor pre-charge switch:
  in response to a determination that the capacitor has been pre-charged to a voltage difference of less than or equal to 20V of the output voltage of the charging station, or
  in response to a determination that the capacitor has been pre-charged to at least half of the voltage of the battery.

2. The electric vehicle charging system of claim 1, wherein the defined fraction comprises ½ the voltage of the battery.

3. The electric vehicle charging system of claim 1, wherein the inverter is connected to the charging station.

4. The electric vehicle charging system of claim 1, wherein the charging station comprises a 400 volt charging station, and wherein the battery comprises an 800 volt battery.

5. The electric vehicle charging system of claim 1, wherein the inverter comprises a duty ratio of 50%.

6. An electric vehicle, comprising:
  a three-phase electric motor;
  an inverter connected to the three-phase electric motor and to a battery, wherein the inverter comprises a switch, a bypass switch, a capacitor pre-charge switch, and a capacitor; and
  a controller, comprising a processor,
  wherein the capacitor pre-charge switch is located between a positive terminal of a charging station and the switch, closable based on a type of the charging station,
  wherein the controller closes the switch to precharge the capacitor via the battery using the inverter and the three-phase electric motor in a buck mode, to a defined fraction of a voltage of the battery in response to a determination, by the controller, that the charging station connected to the electric vehicle comprises a maximum output voltage lower than a maximum voltage of the battery,
  wherein the controller closes the bypass switch to charge the battery directly from the charging station, without using the three-phase electric motor and the inverter for a boost operation, in response to a determination that the maximum voltage of the battery is lower than or equal to the maximum output voltage of the charging station,
  wherein the battery is charged using the capacitor, inverter, and three-phase electric motor when the charging station comprises an output voltage lower than the voltage of the battery, and
  wherein based on a type of the charging station, the controller closes the capacitor pre-charge switch:
    in response to a determination that the capacitor has been pre-charged to a voltage difference of less than or equal to 20V of the output voltage of the charging station, or
    in response to a determination that the capacitor has been pre-charged to at least half of the voltage of the battery.

7. The electric vehicle of claim 6, wherein
  the three-phase electric motor and the inverter operate as a direct current to direct current booster in a first power flow direction, wherein the first power flow direction comprises a direction for transmitting power from the charging station to the battery; and
  the three-phase electric motor and the inverter operate as a buck direct current to direct current converter in a second power flow direction, wherein the second power flow direction comprises a direction for transmitting power supplied by the battery to the capacitor.

8. The electric vehicle of claim 7, wherein
  in the first power flow direction, the capacitor is connected in parallel to the three-phase electric motor and the inverter operating as the direct current to direct current booster; and
  in the second power flow direction, the capacitor is connected in series with the inverter and the three-phase electric motor operating as a buck direct current to direct current converter.

9. The electric vehicle of claim 6, wherein the inverter comprises a three-phase inverter.

10. The electric vehicle of claim 9, wherein the capacitor is connected to a neutral circuit of the three-phase electric motor and each phase the three-phase electric motor is connected to a respective phase of the inverter.

11. The electric vehicle of claim 6, wherein the inverter comprises at least six semi-conductor switches.

12. The electric vehicle of claim 11, wherein the at least six semi-conductor switches comprise insulated-gate bipolar transistors or silicon carbide metal-oxide-semiconductor field-effect transistors.

13. The electric vehicle of claim 6, wherein the defined fraction comprises ½ the voltage of the battery.

14. The electric vehicle of claim 6, wherein the inverter comprises a duty ratio of 50%.

15. A vehicle, comprising:
  a three-phase electric motor;
  an inverter connected to the three-phase electric motor and to a battery, wherein the inverter comprises a switch, a bypass switch, a capacitor pre-charge switch, and a capacitor; and
  a controller, comprising a processor,
  wherein the a capacitor pre-charge switch is located between a positive terminal of a charging station and the switch, closable based on a type of the charging station,
  wherein the controller closes the switch to pre-charge the capacitor via the battery using the inverter and the three-phase electric motor in a buck mode, to a defined fraction of a voltage of the battery, in response to a determination, by the controller, that the charging station connected to the vehicle comprises a maximum output voltage lower than a maximum voltage of the battery,
  wherein the controller closes the bypass switch to charge the battery directly from the charging station, without using the three-phase electric motor and the inverter for a boost operation, in response to a determination that the maximum voltage of the battery is lower than or equal to the maximum output voltage of the charging station, and wherein the battery is charged using the capacitor, inverter, and three-phase electric motor when the charging station comprises an output voltage lower than the voltage of the battery, and wherein based on a type of the charging station, the controller closes the capacitor pre-charge switch:
  in response to a determination that the capacitor has been pre-charged to a voltage difference of less than or equal to 20V of the output voltage of the charging station, or
  in response to a determination that the capacitor has been pre-charged to at least half of the voltage of the battery.

16. The vehicle of claim 15, wherein the defined fraction comprises ½ the voltage of the battery.

17. The vehicle of claim 15, wherein the inverter is connected to the charging station.

18. The vehicle of claim 15, wherein the charging station comprises a 400 volt charging station, and wherein the battery comprises an 800 volt battery.

19. The vehicle of claim 15, wherein the inverter comprises a duty ratio of 50%.

20. The vehicle of claim 15, wherein the inverter comprises at least six semi-conductor switches.

* * * * *